US009792352B1

United States Patent
David et al.

(10) Patent No.: US 9,792,352 B1
(45) Date of Patent: Oct. 17, 2017

(54) MODELING AND PERSISTING MULTIPLE RELATED STATES OF DATA

(71) Applicant: EMC Corporation, Hopkinton, MA (US)

(72) Inventors: Benjamin David, Cork (IE); Dónall O'Suilleabhain, Donnybrook (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 408 days.

(21) Appl. No.: 14/672,410

(22) Filed: Mar. 30, 2015

(51) Int. Cl.
*G06F 17/30* (2006.01)

(52) U.S. Cl.
CPC .. *G06F 17/30604* (2013.01); *G06F 17/30339* (2013.01)

(58) Field of Classification Search
None
See application file for complete search history.

(56) References Cited

U.S. PATENT DOCUMENTS

| | | | | |
|---|---|---|---|---|
| 2005/0015436 A1* | 1/2005 | Singh | ............ | G06F 17/30575 709/203 |
| 2006/0085389 A1* | 4/2006 | Flanagan | .......... | G06F 17/30985 |
| 2013/0103719 A1* | 4/2013 | Gotz | .................. | G06T 11/206 707/798 |
| 2015/0379100 A1* | 12/2015 | Vermeulen | ........ | G06F 17/30575 707/620 |
| 2016/0078085 A1* | 3/2016 | Hu | .................... | G06F 17/30563 707/765 |

OTHER PUBLICATIONS

EMC Corporation, "Strategies for Migrating Block Data to EMC VNX Series Unified Storage Systems," White Paper, http://www.emc.com/collateral/hardware/white-papers/h8248-migrating-block-vnx-wp.pdf, May 2011, 18 pages.
EMC Corporation, "EMC Powerpath Migration Enabler Host Copy: A Detailed Review," White Paper, http://www.emc.com/collateral/software/white-papers/h6927-powerpath-migration-enabler-wp.pdf, Mar. 2011, 42 pages.
EMC Corporation, "EMC Unified Storage Solutions: Oracle Database 11gR2 with EMC VNX and Storage Replication Consistency," White Paper, http://www.emc.com/collateral/hardware/white-papers/h8223-oracle-vnx-replication-wp.pdf, Apr. 2011, 34 pages.
EMC Corporation, "Migrating Data from an EMC CLARiiON Array to a VNX Platform Using SAN Copy: A 'How-To' Guide Featuring Best Practices," White Paper, http://www.emc.com/collateral/hardware/white-papers/h8173-migrating-clariion-vnx-san-copy-wp.pdf, Feb. 2011, 25 pages.
Globe Software, "Data Migration," http://www.globesoftware.com/home.aspx, 2015, 5 pages.

* cited by examiner

*Primary Examiner* — Son T Hoang
(74) *Attorney, Agent, or Firm* — Ryan, Mason & Lewis, LLP

(57) ABSTRACT

A plurality of data sets is identified. A data model is generated representing the data sets. The data model represents the data sets and variations of the data sets as entities, relationships between the data sets as associations, and values associated with the entities as properties. The data model identifies states corresponding to the data sets wherein each state has associated therewith one or more of the entities, the associations and the properties. A state-aware attribute is maintained for each entity and for each association indicating to which one or more of the states the entity and the association respectively belong.

20 Claims, 7 Drawing Sheets

200

300

400

MODELING AND PERSISTING MULTIPLE RELATED STATES OF DATA

FIELD

The field relates generally to data modeling, and more particularly to techniques for improved state representation in data modeling.

BACKGROUND

As is known, a data model may be used to represent one or more sets of data. By way of example, the one or more sets of data represented by the data model may be associated with a data storage system.

The use of a data model facilitates the planning of the data storage system as the system goes through different states during a set of configuration changes. It is to be understood that a data storage system may be a data center, multiple data centers, or a part of a data center. The ability to simulate a change to a representation of the data center is referred to as "modeling" of the data associated with the data center while actually implementing a change to the data center is referred to as "migration." For example, an administrator can model what a data center would look like given a proposed change to certain resources of a data storage system, while the actual implementation of the resource change would be considered a migration.

By way of example, a configuration change in a data center may involve the migration of a block of data from one storage array in the data center to another storage array in the data center. A data model is used in such migration planning operations.

EMP is a desktop tool for planning migrations of block data from array to array. Atlas is a web-hosted version of EMP with similar functionality. Both of these migration tools require the ability to model hypothetical states of data in the storage arrays/devices as the data will be migrated in stages. Several stages are planned in advance. It is typically necessary to be able to review, report on, and generate scripts relating to each hypothetical state. In these existing tools, states have a nominal date-range associated with them, and these date-ranges may not overlap. There is an implicit chronological order relating the states, i.e., changes in any state must propagate to the next state, and in a chained manner to all subsequent states.

In EMP and Atlas, each hypothetical state is modeled as a full copy of the data model, i.e. each state is persisted to a dedicated (relational) database. While this provides for rapid access to the data model for a given state, there are disadvantages such as, but not limited to: (i) a large amount of duplicate data is stored since the vast majority of a data center model does not typically change between one state and the next; (ii) changes made to a given state must be applied multiple times as they propagate forward, thus carrying a huge performance cost; and (iii) this existing approach obstructs multi-tenancy within a persistence layer.

SUMMARY

Embodiments of the invention provide techniques for improved modeling and persisting multiple states associated with data.

For example, in one embodiment, a method comprises the following steps. A plurality of data sets is identified. A data model is generated representing the data sets. The data model represents the data sets and variations of the data sets as entities, relationships between the data sets as associations, and values associated with the entities as properties. The data model identifies states corresponding to the data sets wherein each state has associated therewith one or more of the entities, the associations and the properties. A state-aware attribute is maintained for each entity and for each association indicating to which one or more of the states the entity and the association respectively belong.

Advantageously, embodiments of the invention reduce the amount of data stored since a single copy of an entity or relationship can be associated with multiple states, and simply propagate changes from state to state since new or updated version of the entity can be written and associated with multiple states at once. In one non-limiting example, the data sets are associated with a data storage system that is involved in a planned data migration, and the data model identifies states of the data sets at different stages of the planned data migration.

These and other features and advantages of the present invention will become more readily apparent from the accompanying drawings and the following detailed description.

DETAILED DESCRIPTION

Embodiments of the invention will be described herein with reference to exemplary computing systems, data centers and data storage systems, and associated servers, computers, storage units and devices and other processing devices. It is to be appreciated, however, that embodiments of the invention are not restricted to use with the particular illustrative system and device configurations shown. Moreover, the phrases "computing system," "data center" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

It is to be further understood that while illustrative embodiments herein describe state management with respect to data associated with a data storage system during a planned migration, embodiments are not limited to this specific data domain but rather are more generally applicable to any other data domain that might benefit from the state management techniques described herein. For example, embodiments can be implemented in any domain in which a system or environment can be modeled, and whereby certain future events will change the system or environment in some way, but where one wants to run different scenarios (e.g., different starting points and/or different changes). Thus, embodiments can be applied to any strategy planning or modeling applications.

State management refers to the ability to maintain multiple distinct representations of a set of entities, along with their properties and associations. The representation of a set of entities, along with their properties and associations, constitutes a "state." By way of example only, an "entity," in the context of a data model associated with a data storage system or data center, may be some specific data stored in a storage array or other storage device that will be affected by a migration to be performed in stages. Thus, a state in this example would be the representation of a set of data sets (entities) that are involved in the particular data migration.

States can be related to each other. A state can be related to multiple other states. For instance, states can be related to each other chronologically, where each state represents a set of entities at a specific time. In this configuration, changes brought to a given state must be propagated to subsequent states.

In order to accommodate multiple states in a single data model, with specific illustrative goals of: (i) reducing the amount of data stored; (ii) reducing the complexity of propagating changes to subsequent states; and (iii) improving the performance of propagating changes to subsequent states, embodiments of the invention provide a method of modeling states within the data model.

Figure 1A:
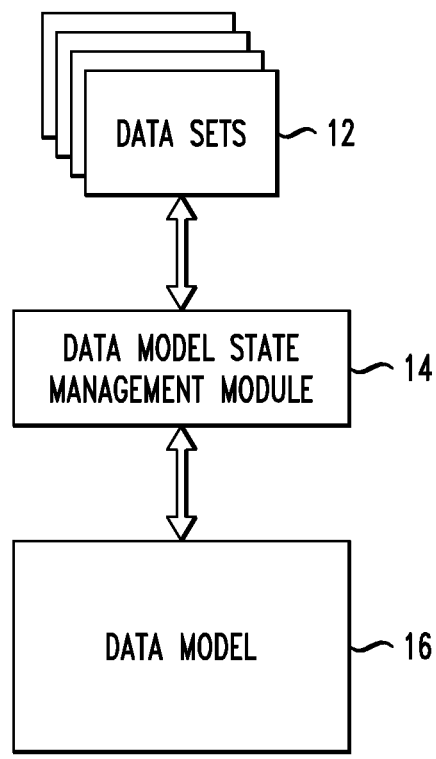
FIG. 1A shows a data environment with state modeling and persisting according to an embodiment of the invention.
Figure 2:
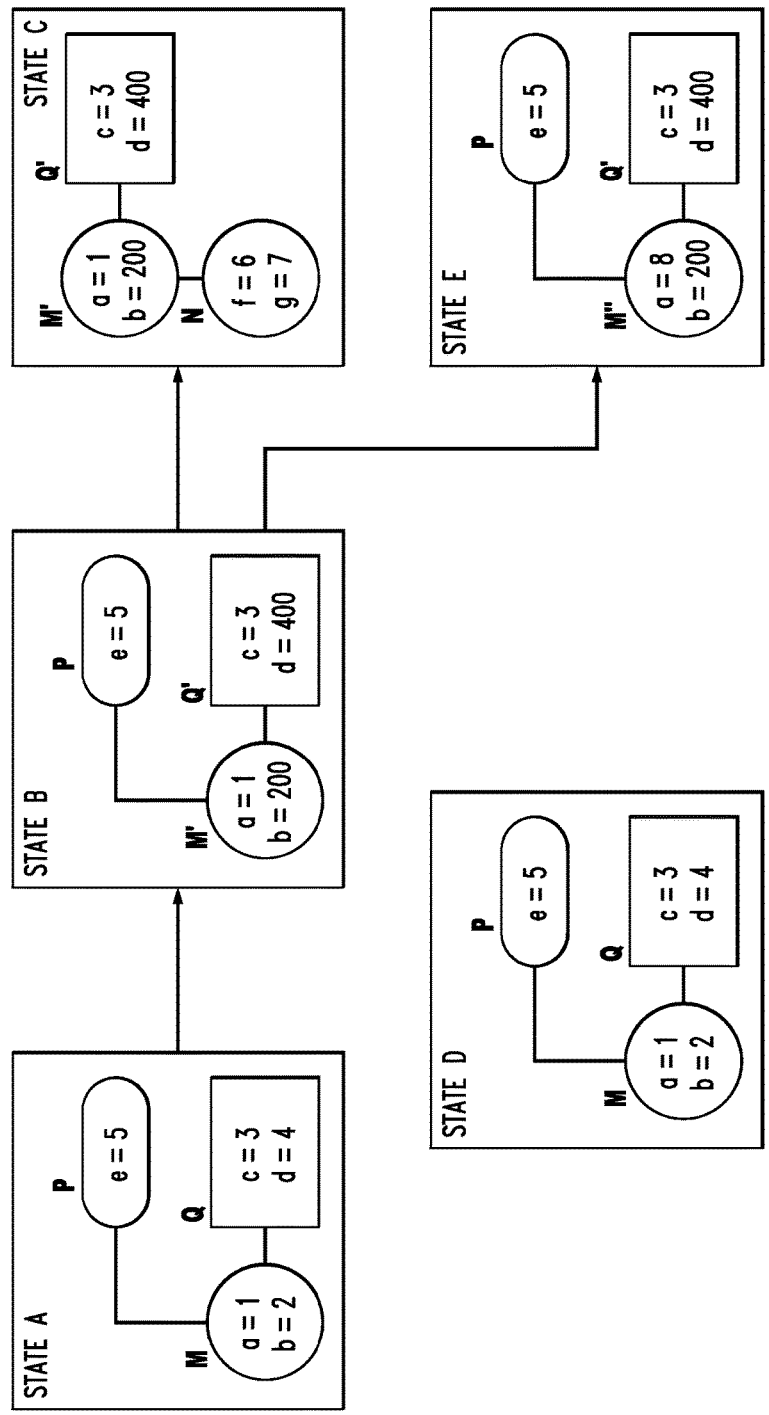
FIG. 2 shows a data model used to illustrate an embodiment of the invention.
Figure 3:
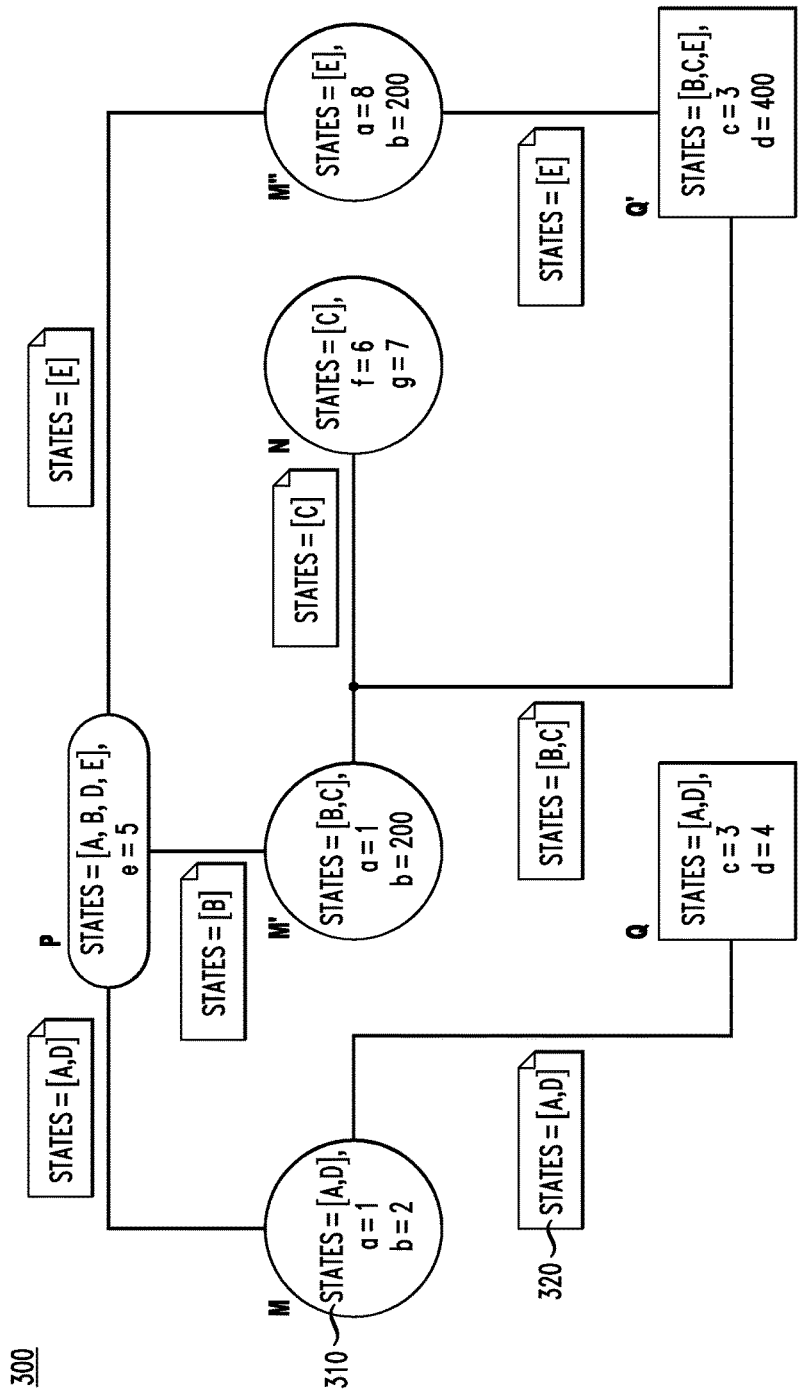
FIG. 3 shows a data model according to an embodiment of the invention.
Figure 4:
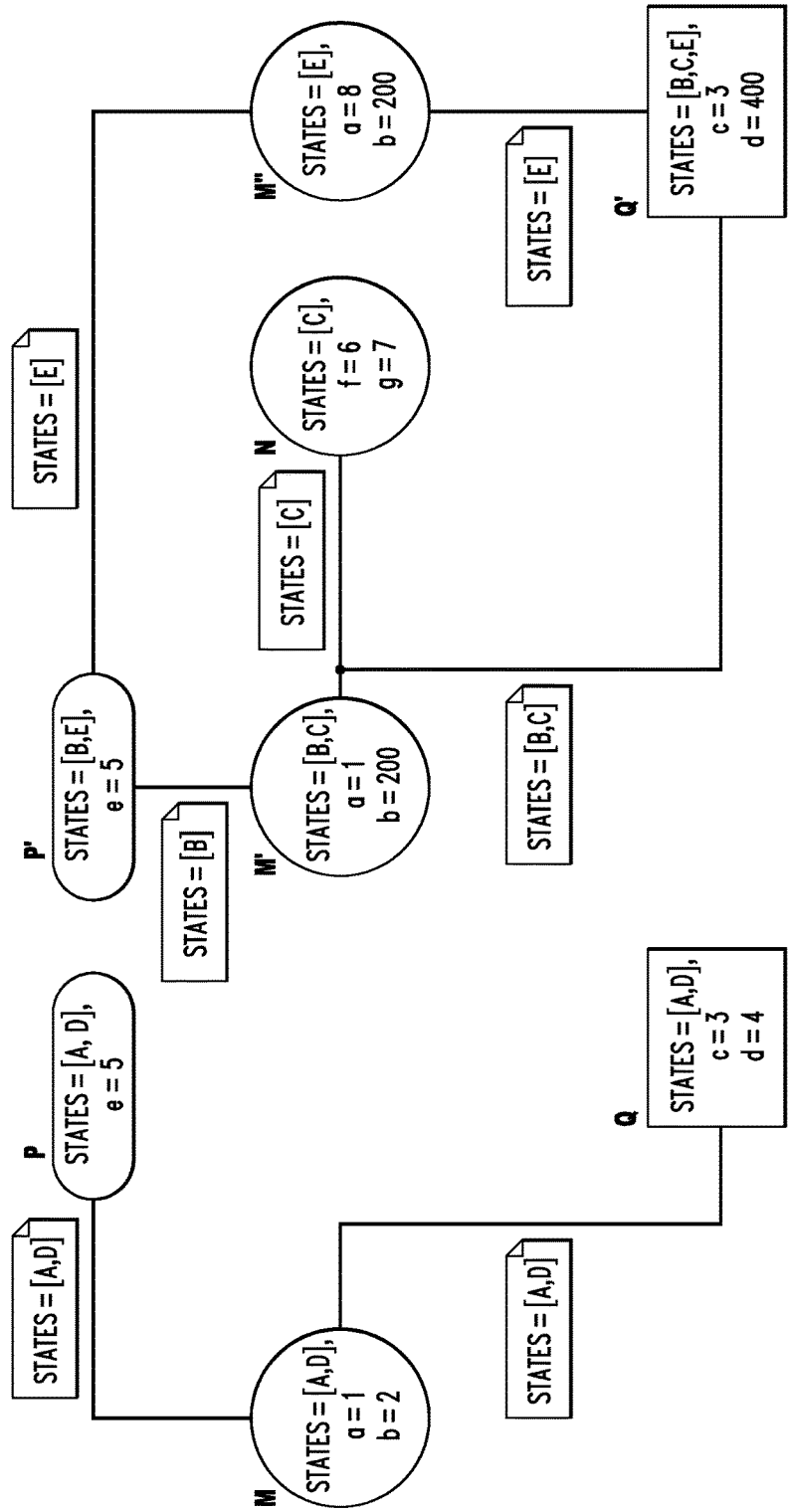
FIG. 4 shows a data model according to an embodiment of the invention.

FIG. 1A shows a data environment with state modeling and persisting according to an embodiment of the invention. As shown in the data environment 10 in FIG. 1A, a plurality of data sets 12 are identified. Data model state management module 14 generates a data model 16 representing the data sets 12. The data model 16 represents the data sets and variations of the data sets as entities, relationships between the data sets as associations, and values associated with the entities as properties. The data model 16 identifies states corresponding to the data sets wherein each state has associated therewith one or more of the entities, the associations and the properties. A state-aware attribute, as will be further explained below in the context of FIGS. 2-4 is maintained in accordance with the data model state management module 14 for each entity and for each association indicating to which one or more of the states the entity and the association respectively belong.

Figure 1B:
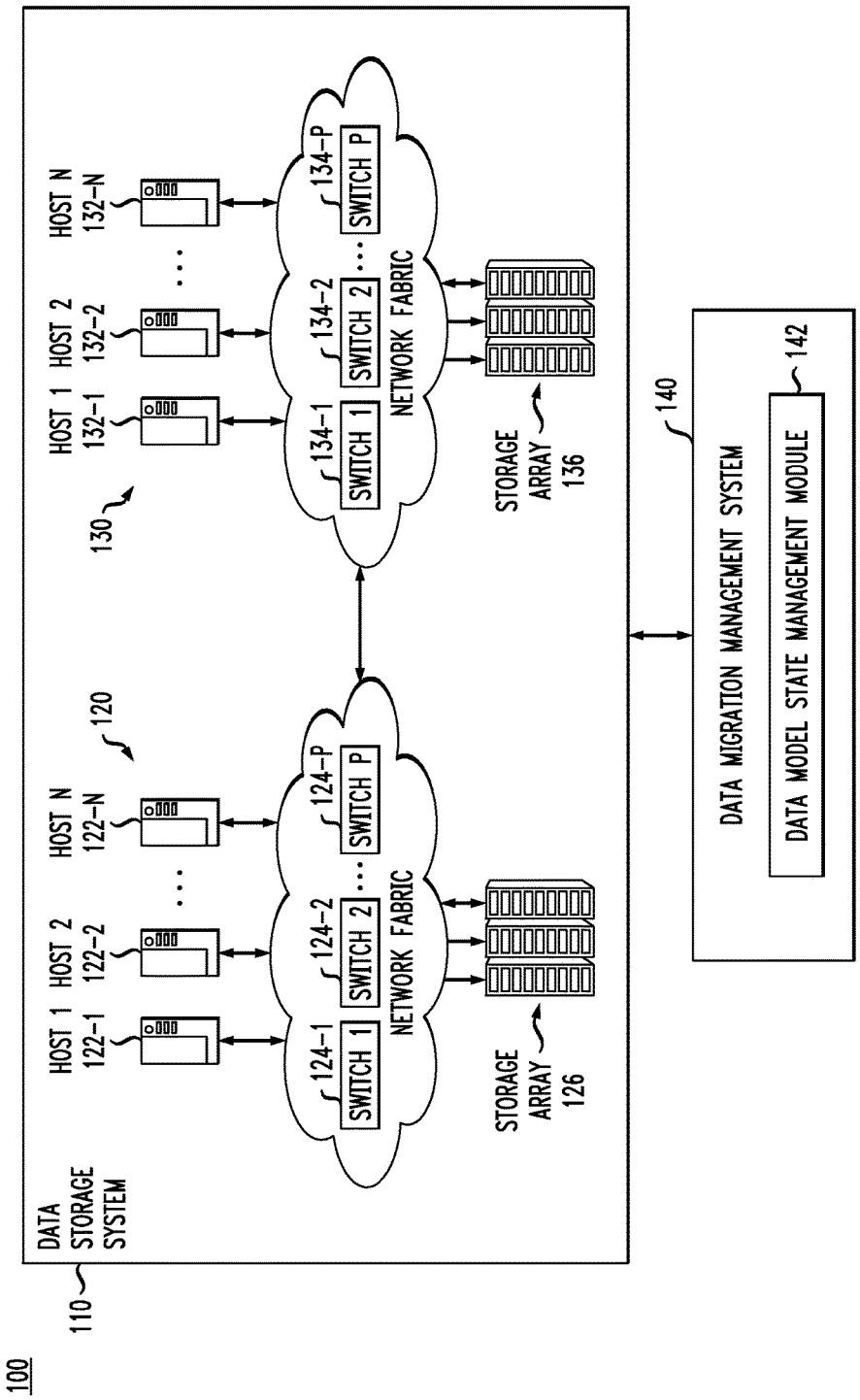
FIG. 1B shows a data storage environment with a data migration management system with state modeling and persisting according to an embodiment of the invention.

FIG. 1B shows a data storage environment with state modeling and persisting according to an embodiment of the invention. FIG. 1B is a data migration domain example of environment 10 of FIG. 1A. As shown in data storage environment 100 in FIG. 1B, a data storage system 110 (e.g., representing a data center, multiple data centers, or a part of a data center) includes a first data storage subsystem 120 and a second data storage subsystem 130. The first data storage subsystem 120, as shown, includes a plurality of host computing devices 122-1, 122-2, ..., 122-N, a plurality of switches 124-1, 124-2, ..., 124-P implemented as part of a network fabric (e.g., Fibre Channel fabric), and at least one storage array 126. Similarly, the second data storage subsystem 130, as shown, includes a plurality of host computing devices 132-1, 132-2, ..., 132-N, a plurality of switches 134-1, 134-2, ..., 134-P implemented as part of a network fabric (again, e.g., Fibre Channel fabric), and at least one storage array 136.

It is to be appreciated that while the data storage system 110 illustrates two data storage subsystems, system 110 may include a larger or smaller number of subsystems. Also, it is to be understood that while execution components shown in each subsystem include hosts, switches, fabric, and storage arrays, one or more of the subsystems may include additional execution components not expressly shown. For example, when the data storage system 110 is implemented as part of a distributed virtual infrastructure, each host may have associated therewith one or more virtual machines (VMs), while each storage array may have associated therewith one or more logical units (LUNs). Thus, each subsystem can have both logical execution components and physical execution components. Also, it is to be understood that each storage array may have one or more physical storage devices associated therewith.

Also shown in system environment 100 is a data migration management system 140. The management system 140 is a computer-based tool used by administrators of the data storage system 110 to plan and automate the acquisition, distribution and migration of data within the data storage system. Thus, assume that data has to be migrated from storage array 126 in subsystem 120 to storage array 136 in subsystem 130, or vice versa. Also, data may need to be migrated from one storage array to another storage array within the same subsystem. Reasons for the data migration are application-dependent, but could be driven by data and resource management decisions made by the infrastructure provider.

The management system 140 includes a data model state management manager 142, which is configured to control, inter alia, modeling and persisting multiple hypothetical states of the data storage system 110 (as described further below) associated with the migration of data in the data storage system 110. It is to be understood that module 142 is a data migration domain version of module 14 in FIG. 1A.

As illustrated in FIGS. 2-4 and as will be described in detail below, a data model comprises a network of associated entities. The data that needs to be managed, in a state-aware manner, is ultimately described as entities and relationships. This is the case, regardless of the data store (or data domain) to be used, e.g.: tables and foreign keys/join tables in a relational database; nodes and edges in a graph database; documents/aggregates with implicit associations in key-value database; etc.

Consider data model 200 depicted in FIG. 2. Five states are shown: states A, B, C, D and E. Each state has a set of entities (data sets) depicted as M, N, P and Q (or variations thereof as will be explained). Each entity (data set) is represented by one or more properties (data values) depicted as a, b, c, d, e, f and g. It is to be understood that the data sets and data values are simplified for the sake of explanation; however, techniques described herein can be used with more complex data sets and data values.

There is a propagation association between states A and B, captured in the form of an arrow, i.e., changes made to state A should propagate to state B. There are propagation associations between state B and both states C and E, such that changes made to state B should propagate to both of these states. State D may have been created by cloning state A, but there is no propagation association between these, so although they contain the same data, changes made in one state do not propagate to the other. There is no propagation association leading into either of states A or D; changes made in other states will not affect them. There is no propagation association leading out of any of states C, D, or E; changes made in these states will not affect any other states.

The representation of entity P is common to states A, B and E, and therefore need only be persisted once. However, the entity needs to be associated with states A, B and E, but not with state C.

Entity M exists in state A, but a property is updated in state B (data value b=2 in state A, but b=200 in state B), and therefore a new version (variation) of entity M (or at least the delta), denoted as M', is created and then associated with state B and all states that are "downstream" for propagation, i.e., states C and E. Furthermore, in state E note where entity M' is updated (data value a=1 in states B and C, but a=8 in state E), and therefore a new version (variation) of entity M' (or at least the delta), denoted as M", is created. Similarly, data model 200 shows entity Q in state A and new version (variation) Q' (with data value d updated in the latter) in states B, C and E. State C also has an entity N that the other states do not contain.

In accordance with embodiments of the invention, by embedding state information into the entities and relationships (associations), the following exemplary use cases can advantageously be achieved:
(i) add an entity to a given state or set of states;
(ii) update an entity within a given state or set of states;
(iii) remove an entity from a given state or set of states;
(iv) add an association between two entities in a given state or set of states;
(v) update an association between two entities in a given state or set of states;
(vi) remove an association between two entities in a given state or set of states;
(vii) propagate any of the above additions, updates or removals to subsequent states; and
(viii) retrieve the version of a given entity or set of entities, and their associated entities, from a particular state.

Entities and relationships, inasmuch as they exist and are persisted, are made state-aware, and state becomes a shared concept of the entities and relationships. Management of the states, and the association of entities and relationships to states, is achieved through the persistence of entities and relationships.

Consider data model 300 depicted in FIG. 3, where the states A, B, C, D and E (as discussed above in the context of FIG. 2) are embedded into the entities and relationships.

Now, as shown in FIG. 3, there are three versions (variations) of entity M created and managed, i.e., M, M' and M", but that is because its properties (e.g., data values) changed twice from the initial as noted above. There is only one copy of entity P, which exists in four states A, B, D, and E. There are two versions of entity Q; the second of these, Q', belongs to three states B, C and E itself, and is related to two different versions of entity M, i.e., M' and M" as denoted by the association lines connecting the entities, each of which belongs to a different set of states (M' belongs to states B and C, and M" belongs to state E).

Although some benefits of making the entities and relationships state-aware in this running example may not appear extensive, this is merely because the relative amount of churn in the data is large in the running example, with a relatively significant amount of creations (1), updates (3), and deletions for a model of only four entities over the three post-initial states.

A new state can be created as a copy of an existing state simply by the addition of a new entry in the "states" properties of the entities (e.g., state-aware attribute 310) and relationships (e.g., state-aware attribute 320) that already exist in the copied state. There is no need to duplicate the data.

A change in one version of an entity can be easily propagated to subsequent states, subject to the associations outlined above. Take for example entity P; if the value of its property "e" was updated in state B, the update would not need to be propagated to state E. Rather, a new version of entity P would need to be created, call it P', with the updated property, and this version would need to be associated with state B and any subsequent states (in this case, only E), while the original entity P would need to be dis-associated from states B and E. The result would be the following as shown in data model 400 of FIG. 4.

As shown in FIG. 4, if a change were made to any of the entities in state D, a new version of that entity would have to be created, and associations updated, but the changes would not affect any other state.

Although there is some additional overhead at the addition, update and removal of entities and relationships, the ability to identify, within the entities and relationships themselves, which states they belong to makes it possible to both:
(i) reduce the amount of data stored (unless every entity and relationship changes in every state)—a single copy of an entity or relationship can be associated with multiple states; and
(ii) simply propagate changes from state to state—the new or updated version of the entity can be written and associated with multiple states at once.

Retrieval from specific states must also be state-aware, i.e., queries on the data store must now identify the state of interest, through, e.g., criteria or some other appropriate mechanism.

The name of the "state-association" property (state-aware attribute), or column, is common across all state-aware entities and many-to-many relationships, allowing for a common logic to be built into the clients for persisting of entities and relationships to specific states and retrieval of entities from specific states.

Example 1: Relational Models

In a relational database model, entities are stored as rows in tables, and relationships are stored as foreign-key references, which may refer to entries in Join tables for many-to-many relationships. Thus, in this scenario, a dedicated "state-association" property on every entity, implemented as a dedicated column on the associated tables, would identify the states to which this version of the entity or many-to-many relationship belongs.

Example 2: Graph Models

In a graph database model, entities are stored as nodes, and relationships are stored as edges. Thus, in this scenario, a dedicated "state-association" property on every entity, implemented as a property (preferably indexed) on the associated nodes and edges, would identify the states to which this version of the entity or relationship belongs.

Figure 5:
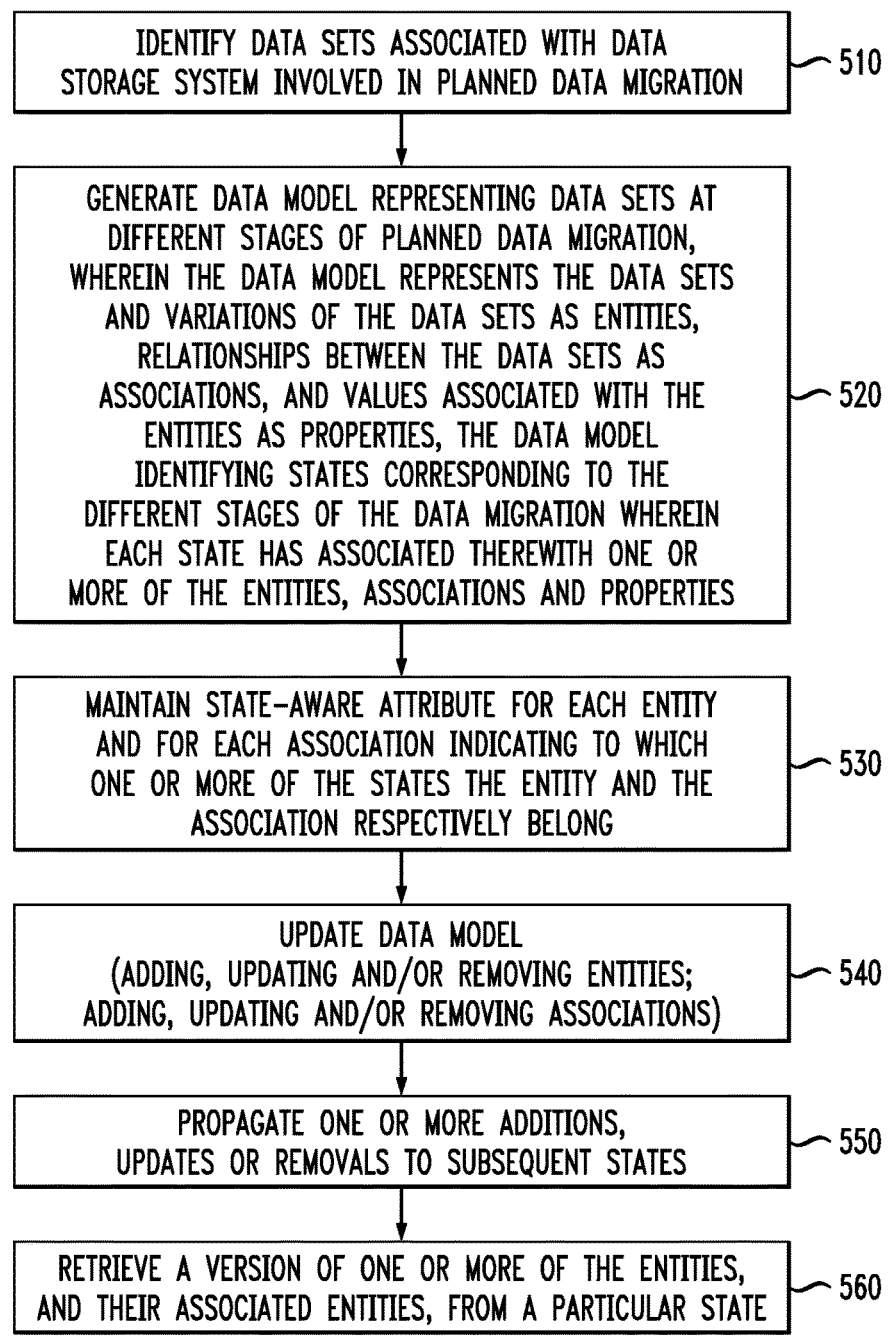
FIG. 5 shows a methodology for modeling and persisting multiple states of a data storage system according to an embodiment of the invention.

FIG. 5 illustrates modeling and persisting multiple states of a data storage system according to an embodiment of the invention. As shown, in methodology 500, step 510 identifies data sets associated with the data storage system involved in the planned data migration.

In step 520, a data model is generated representing data sets at different stages of planned data migration. The data model represents the data sets and variations of the data sets as entities, relationships between the data sets as associations, and values associated with the entities as properties. The data model identifies states corresponding to the different stages of the data migration wherein each state has associated therewith one or more of the entities, associations and properties.

In step 530, a state-aware attribute is maintained for each entity and for each association indicating to which one or more of the states the entity and the association respectively belong.

In step 540, the data model is updated (e.g., adding, updating and/or removing entities, and adding, updating and/or removing associations).

In step 550, one or more additions, updates or removals are propagated to subsequent states.

In step 560, upon request, a version is retrieved of one or more of the entities, and their associated entities, from a particular state.

It is to be appreciated that the above steps may be performed under control of the data model state management module 142 of FIG. 1B.

Figure 6:
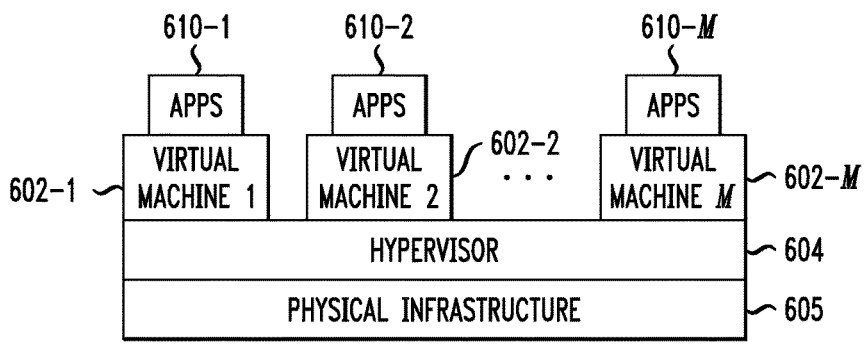
FIGS. 6 and 7 show examples of processing platforms that may be utilized to implement at least a portion of the systems of FIGS. 1A and 1B.

It is to be appreciated that one or more of the systems and subsystems shown in FIGS. 1A and 1B may comprise cloud infrastructure, an example of which is illustrated in FIG. 6. As shown, a cloud infrastructure 600 comprises virtual machines (VMs) 602-1, 602-2, . . . 602-M implemented using a hypervisor 604. The hypervisor 604 is an example of what is more generally referred to herein as "virtualization infrastructure." The hypervisor 604 runs on physical infrastructure 605 (e.g., such as may include CPUs and/or storage devices). The cloud infrastructure 600 further comprises sets of applications 610-1, 610-2, . . . 610-M running on respective ones of the virtual machines 602-1, 602-2, . . . 602-M (utilizing associated logical units (LUNs)) under the control of the hypervisor 604.

Although only a single hypervisor 604 is shown in the example of FIG. 6, a given embodiment of a cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 604 which, as shown in FIG. 6, is directly inserted on top of the computer hardware in order to allocate hardware resources of the physical computer (physical infrastructure 605) dynamically and transparently. The hypervisor 604 affords the ability for multiple operating systems to run concurrently on a single physical computer and share hardware resources with each other.

An example of a commercially available hypervisor platform that may be used to implement portions of the cloud infrastructure 600 in one or more embodiments of the invention is the VMware vSphere which may have an associated virtual infrastructure management system such as the VMware vCenter. The underlying physical infrastructure 605 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 600.

Figure 7:
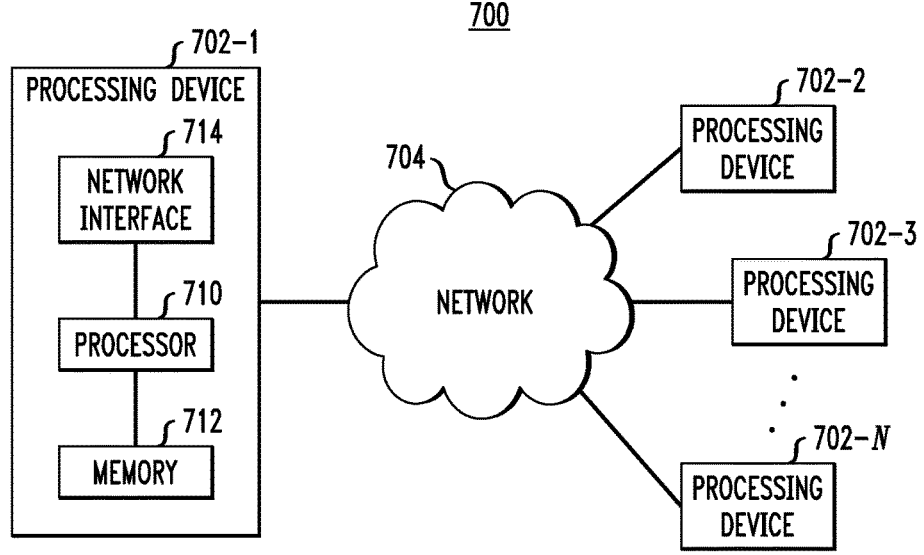

An example of a processing platform on which the cloud infrastructure 600 and/or the data migration system 140 and data model state management module 142 of FIG. 1B (and data model state management module 14 of FIG. 1A) may be implemented is processing platform 700 shown in FIG. 7. The processing platform 700 in this embodiment comprises a plurality of processing devices denoted 702-1, 702-2, 702-3, . . . 702-N, which communicate with one another over a network 704. One or more of the elements of FIGS. 1A and 1B may therefore each run on one or more computers or other processing platform elements, each of which may be viewed as an example of what is more generally referred to herein as a "processing device." As illustrated in FIG. 7, such a device generally comprises at least one processor 710 and an associated memory 712, and implements one or more functional modules for controlling certain features of systems 10 and 100. Again, multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. The memory 712 may be viewed as an example of what is more generally referred to herein as a "computer program product" or "an article of manufacture." An article of manufacture or a computer program product comprise a processor-readable storage medium (which is a non-transitory medium and excludes propagating signals) having encoded therein executable code of one or more software programs. Such a memory may comprise electronic memory such as random access memory (RAM), read-only memory (ROM) or other types of memory, in any combination. The computer program code when executed by a processing device such as the processing device 702-1 causes the device to perform functions associated with one or more of the elements of system 10 and system 100. One skilled in the art would be readily able to implement such software given the teachings provided herein. Other examples of computer program products embodying embodiments of the invention may include, for example, optical or magnetic disks.

Also included in the processing device 702-1 is network interface circuitry 714, which is used to interface the server with the network 704 and other system components. Such circuitry may comprise conventional transceivers of a type well known in the art.

The other processing devices 702 of the processing platform 700 are assumed to be configured in a manner similar to that shown for processing device 702-1 in the figure.

The processing platform 700 shown in FIG. 7 may comprise additional known components such as batch processing systems, parallel processing systems, physical machines, virtual machines, virtual switches, storage volumes, logical units, etc. Again, the particular processing platform shown in FIG. 7 is presented by way of example only, and system 10 of FIG. 1A and system 100 of FIG. 1B may include additional or alternative processing platforms, as well as numerous distinct processing platforms in any combination.

Also, numerous other arrangements of servers, computers, storage devices or other components are possible in system 100. Such components can communicate with other elements of the systems 10 and 100 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, data centers, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   identifying a plurality of data sets;
   generating a data model representing the plurality of data sets, wherein the data model represents the plurality of data sets and variations of the plurality of data sets as entities, relationships between the plurality of data sets as associations, and values associated with the entities as properties, the data model identifying states corresponding to the plurality of data sets wherein
      each state has associated therewith one or more of the entities, the associations and the properties,
      at least one entity or one relationship is associated with multiple states and any changes of the one entity or the one relationship are written and associated with the multiple states at once, and
      the plurality of data sets is associated with a data storage system implementing a planned data migration, and the data model identifies each of the states of the plurality of data sets at a corresponding stage of different stages of the planned data migration;
   maintaining a state-aware attribute for each entity and, for each association, indicating to which one or more of the states the entity and the association respectively belong in the state-aware attribute;
   updating the data model comprising at least one of adding, updating and removing one or more of an entity and an association; and
   reflecting the update of the data model in a corresponding state-aware attribute;
   wherein the steps of the method are executed via at least one processor coupled to a memory.

2. The method of claim 1, further comprising updating the data model by adding an entity to one or more of the states and reflecting the addition in the corresponding state-aware attribute.

3. The method of claim 1, further comprising updating the data model by updating an entity within one or more of the states and reflecting the update in the corresponding state-aware attribute.

4. The method of claim 1, further comprising updating the data model by removing an entity from one or more of the states and reflecting the removal in the corresponding state-aware attribute.

5. The method of claim 1, further comprising updating the data model by adding an association between two of the entities in one or more of the states and reflecting the addition in the corresponding state-aware attribute.

6. The method claim 1, further comprising updating the data model by updating an association between two of the entities in one or more of the states and reflecting the update in the corresponding state-aware attribute.

7. The method of claim 1, further comprising updating the data model by removing an association between two of the entities in one or more of the states and reflecting the removal in the corresponding state-aware attribute.

8. The method of claim 1, further comprising updating the data model by propagating one or more additions, updates or removals to subsequent states.

9. The method of claim 1, further comprising retrieving a version of one or more of the entities, and their associated entities, from a particular state.

10. The method of claim 1, wherein the states are hypothetical states.

11. The method of claim 1, wherein the plurality of data sets is associated with a relational database.

12. The method of claim 11, wherein the entities are stored as rows in tables and the associations are stored as foreign-key references which refer to entries in join tables for many-to-many relationships.

13. The method of claim 12, wherein corresponding state-aware attributes of the entities are implemented in a column on associated tables.

14. The method of claim 1, wherein the plurality of data sets is associated with a graph database.

15. The method of claim 14, wherein the entities are stored as nodes and the associations are stored as edges in the graph database.

16. The method of claim 15, wherein the corresponding state-aware attributes are implemented as properties on the nodes and edges.

17. An article of manufacture comprising a processor-readable storage medium having encoded therein executable code of one or more software programs, wherein the one or more software programs when executed by one or more processing devices implement steps of:
   identifying a plurality of data sets;
   generating a data model representing the plurality of data sets, wherein the data model represents the plurality of data sets and variations of the plurality of data sets as entities, relationships between the plurality of data sets as associations, and values associated with the entities as properties, the data model identifying states corresponding to the plurality of data sets wherein
      each state has associated therewith one or more of the entities, the associations and the properties,
      at least one entity or one relationship is associated with multiple states and any changes of the one entity or the one relationship are written aand associated with the multiple states at once, and
      the plurality of data sets is associated with a data storage system implementing a planned data migration, and the data model identifies each of the states of the plurality of data sets at a corresponding stage of different stages of the planned data migration;
   maintaining a state-aware attribute for each entity and, for each association, indicating to which one or more of the states the entity and the association respectively belong in the state-aware attribute;

updating the data model comprising at least one of adding, updating and removing one or more of an entity and an association; and reflecting the update of the data model in a corresponding state-aware attribute.

18. The article of manufacture of claim 17, wherein the one or more software programs when executed by the one or more processing devices further implement a step of updating the data model by adding an entity to one or more of the states and reflecting the addition in the corresponding state-aware attribute.

19. An apparatus comprising:

a hardware memory; and a hardware processor operatively coupled to the hardware memory and configured to:

identify a plurality of data sets;

generate a data model representing the plurality of data sets, wherein the data model represents the plurality of data sets and variations of the plurality of data sets as entities, relationships between the plurality of data sets as associations, and values associated with the entities as properties, the data model identifying states corresponding to the plurality of data sets wherein each state has associated therewith one or more of the entities, the associations and the properties, at least one entity or one entity or one relationship is associated with multiple states and any changes of the one entity or the one relationship are written and associated with the multiple states at once, and the plurality of data sets is associated with a data storage system implementing a planned data migration, and the data model identifies each of the states of the plurality of data sets at a corresponding stage of different stages of the planned data migration;

maintain a state-aware attribute for each entity and, for each association, indicating to which one or more of the states the entity and the association respectively belong in the state-aware attribute;

update the data model comprising at least one of adding, updating and removing one or more of an entity and an association; and reflect the update of the data model in a corresponding state-aware attribute.

20. The apparatus of claim 19, wherein the processor operatively coupled to the memory and further configured to update the data model by adding an entity to one or more of the states and reflecting the addition in the corresponding state-aware attribute.

* * * * *